United States Patent
Phillips

(10) Patent No.: US 10,030,557 B2
(45) Date of Patent: Jul. 24, 2018

(54) EXHAUST PASSAGE HAVING FIRST AND SECOND CATALYSTS

(71) Applicant: Ford Global Technologies, LLC, Dearborn, MI (US)

(72) Inventor: John Eric Byron Phillips, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/350,744

(22) Filed: Nov. 14, 2016

(65) Prior Publication Data

US 2018/0135481 A1    May 17, 2018

(51) Int. Cl.
    *F01N 3/00*        (2006.01)
    *F01N 3/035*     (2006.01)
    *F01N 3/10*        (2006.01)
    *F01N 3/20*        (2006.01)

(52) U.S. Cl.
    CPC ............. *F01N 3/035* (2013.01); *F01N 3/101* (2013.01); *F01N 3/2066* (2013.01); *F01N 2250/02* (2013.01); *F01N 2570/16* (2013.01)

(58) Field of Classification Search
    USPC ......... 60/274, 287, 288, 289, 291, 292, 293, 60/300, 323, 324
    See application file for complete search history.

(56) References Cited

U.S. PATENT DOCUMENTS

| | | | |
|---|---|---|---|
| 4,193,289 A | 3/1980 | Springer et al. | |
| 5,034,023 A | 7/1991 | Thompson | |
| 5,649,517 A | 7/1997 | Poola et al. | |
| 6,378,298 B2* | 4/2002 | Harima | F01N 3/05 60/274 |
| 6,609,582 B1* | 8/2003 | Botti | B60K 6/24 180/309 |
| 7,607,291 B2* | 10/2009 | Driscoll | F01N 3/0821 60/274 |
| 7,793,490 B2 | 9/2010 | Amon et al. | |
| 8,087,230 B2 | 1/2012 | Kikuchi et al. | |
| 8,186,150 B2* | 5/2012 | Bourdon | F01N 3/2053 60/274 |
| 8,852,409 B2 | 10/2014 | Jankowiak et al. | |
| 2002/0175212 A1 | 11/2002 | Hepburn et al. | |
| 2004/0007134 A1 | 1/2004 | Parsa | |
| 2006/0213187 A1 | 9/2006 | Kupe et al. | |
| 2008/0295499 A1 | 12/2008 | Driscoll et al. | |
| 2009/0120070 A1* | 5/2009 | Hirata | B01D 53/944 60/286 |
| 2011/0179778 A1* | 7/2011 | Durrett | B01D 53/22 60/299 |
| 2014/0286827 A1 | 9/2014 | Kawada et al. | |

FOREIGN PATENT DOCUMENTS

| | | | |
|---|---|---|---|
| CN | 2237947 Y | 10/1996 | |
| JP | 2003027926 A * | 1/2003 | ............... F01N 3/08 |

* cited by examiner

*Primary Examiner* — Binh Q Tran
(74) *Attorney, Agent, or Firm* — Julia Voutyras; McCoy Russell LLP

(57) ABSTRACT

Methods and systems are provided for at least one catalyst and an oxygen filter. In one example, a method may include filtering oxygen through the oxygen filter and flowing oxygen poor exhaust gas to a catalyst.

16 Claims, 4 Drawing Sheets

EXHAUST PASSAGE HAVING FIRST AND SECOND CATALYSTS

FIELD

The present description relates generally to an exhaust passage comprising a catalyst configured to receive oxygen-poor exhaust gas flow.

BACKGROUND/SUMMARY

One technology for after-treatment of engine exhaust utilizes three-way catalyst (TWC) devices, which facilitate certain chemical reactions to occur between $NO_x$ in the exhaust and ammonia ($NH_3$). The TWC facilitates the reaction between $NH_3$ and $NO_x$ to convert $NO_x$ into nitrogen ($N_2$) and water (H2O). However, as recognized by the inventors herein, issues with reactivity arise when oxygen concentrations at the TWC are too high. For example, the $NH_3$ may react with oxygen to produce nitrous oxide instead of reducing the $NO_x$ constituents. This may force engine operating parameters to avoid operating under lean air/fuel ratios, thereby decreasing a fuel efficiency. In some examples, additionally or alternatively, $NO_x$ may entropically decompose in the presence of a catalyst to form $N_2$ and $O_2$. However, this decomposition may also be hampered by excess $O_2$ being present at the catalyst. In this way, a method for reducing a concentration of $O_2$ at the catalyst is desired.

Other attempts to address $NO_x$ reduction include flow an oxygen containing gas into an oxygen separator and/or oxygen filter. One example approach is shown by Jankowiak et al. in U.S. Pat. No. 8,852,409. Therein, an electric oxygen separator receives oxygen containing gas and separates the oxygen from the remainder of the gas. The separator is further adapted to expel the oxygen to an ambient atmosphere or to a receiver tank where the oxygen is stored. The separator includes one or more check valves and manifolds to direct the flow of oxygen through the system.

However, the inventors herein have recognized potential issues with such systems. As one example, the oxygen separator utilizes electricity to separate oxygen from the oxygen containing gas. This reduces fuel efficiency benefits realized from extending a lean operation of the engine. Additionally, including one or more valves and manifolds increases a manufacturing cost and introduces additional components susceptible to degradation. Furthermore, the valves and manifolds increase a packaging constraint of an exhaust passage, decreasing fuel economy.

In one example, the issues described above may be addressed by a method for enriching oxygen in an exhaust gas stream in a second exhaust passage having an oxygen filter, flowing oxygen poor exhaust gas to a first exhaust passage comprising a catalyst, and merging the oxygen rich and oxygen poor exhaust gas streams at an intersection downstream of the oxygen filter and the catalyst. In this way, a TWC in the first exhaust passage receives oxygen poor exhaust gas to increase $NO_x$ reduction efficiency and extend lean engine operation.

As one example, a main exhaust passage comprises a first catalyst upstream of a bifurcation of the main exhaust passage. In one example, the first catalyst uninterruptedly receives exhaust gas exhausted from an engine. After flowing through the first catalyst, the exhaust gas flows to the bifurcation, where the exhaust gas may flow into the first exhaust passage or the second exhaust passage. Exhaust gas flowing to the second passage flows through the oxygen filter, resulting in an oxygen enriched (oxygen rich) exhaust flow through the second passage. As such, an oxygen deficient (oxygen poor) exhaust flow remains upstream of the oxygen filter. In this way, exhaust gas flowing into the first passage merges with the oxygen poor exhaust flow, where the mixture flows to a second catalyst. By doing this, the mixture comprises a lower concentration of oxygen than exhaust gas flowing to the first catalyst from the engine. As such, a $NO_x$ reduction efficiency is greater in the second catalyst than the first catalyst. In this way, lean engine operation may be extended. In one example, lean engine operation is not terminated in response to the $NO_x$ reduction efficiency decreasing below a threshold efficiency (e.g., less than an emission standard) due to the configuration of the first and second exhaust passages.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-3 are shown approximately to scale

DETAILED DESCRIPTION

Figure 1:
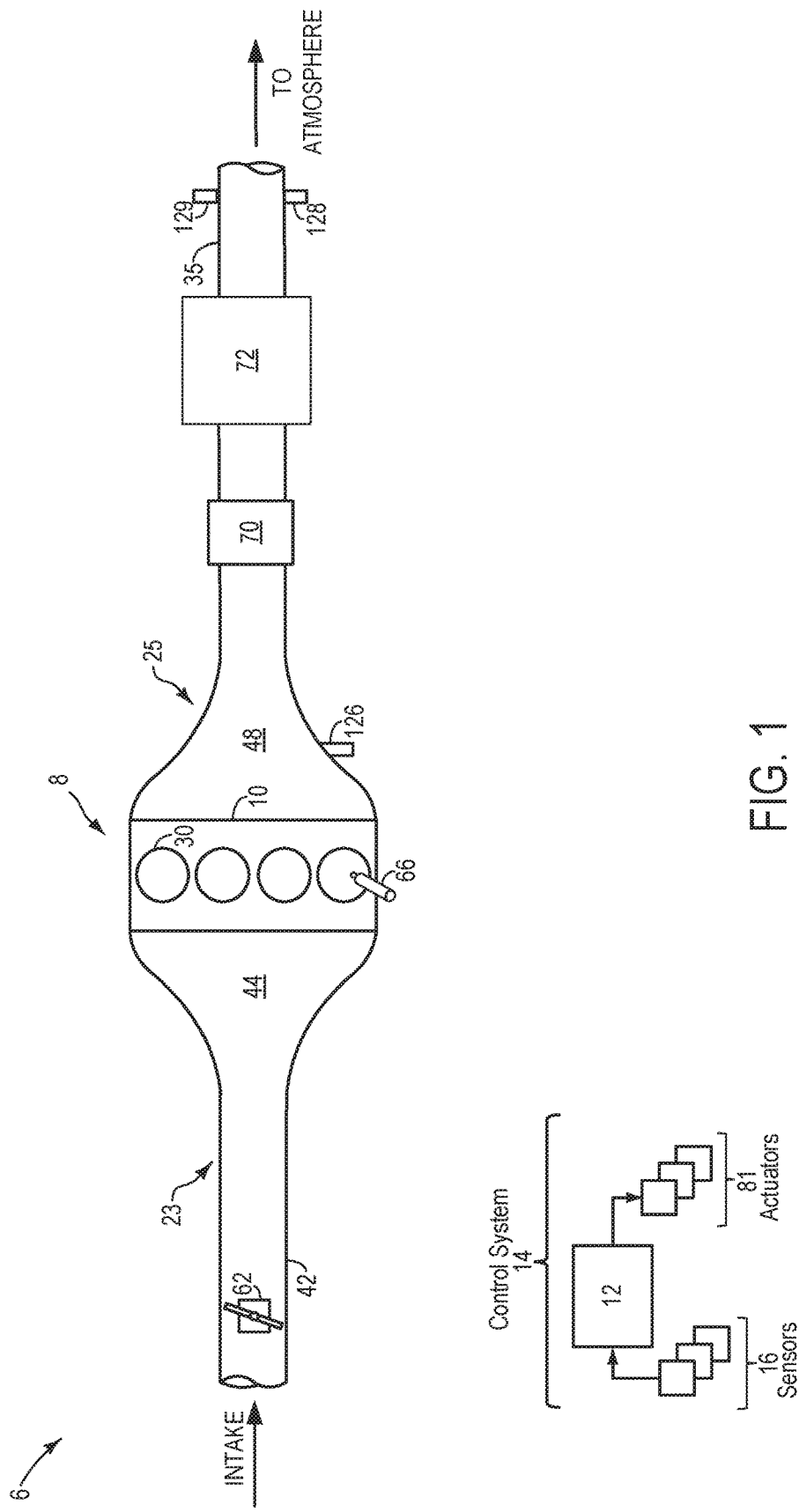
FIG. 1 shows an engine with a plurality of cylinders.
Figure 2:
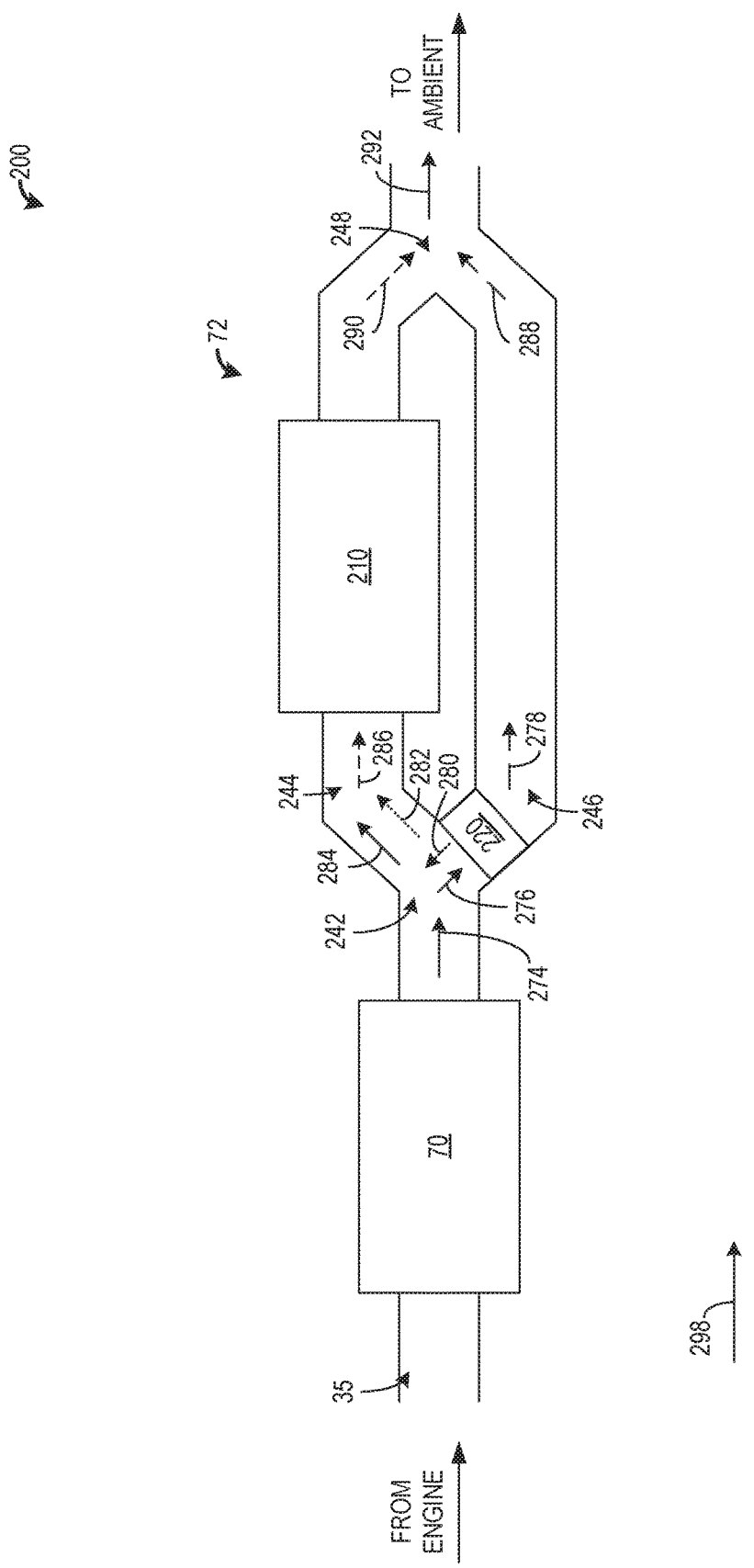
FIG. 2 shows an exemplary embodiment of an exhaust passage comprising a first catalyst upstream of a bifurcation having a first passage with a second catalyst and a second passage with an oxygen filter.
Figure 3:
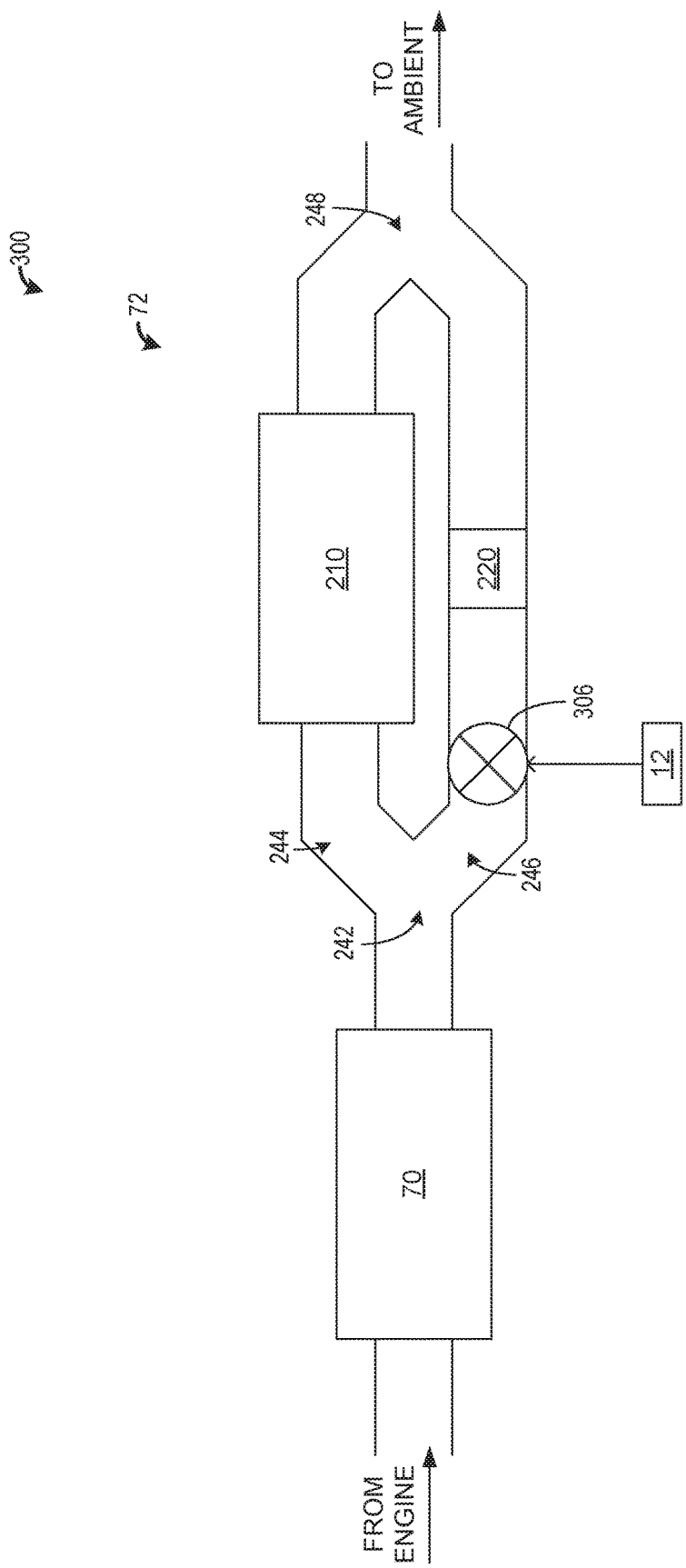
FIG. 3 shows an exemplary embodiment of an exhaust passage comprising a first catalyst upstream of a bifurcation having a first passage with a second catalyst and a second passage with a valve upstream of an oxygen filter.
Figure 4:
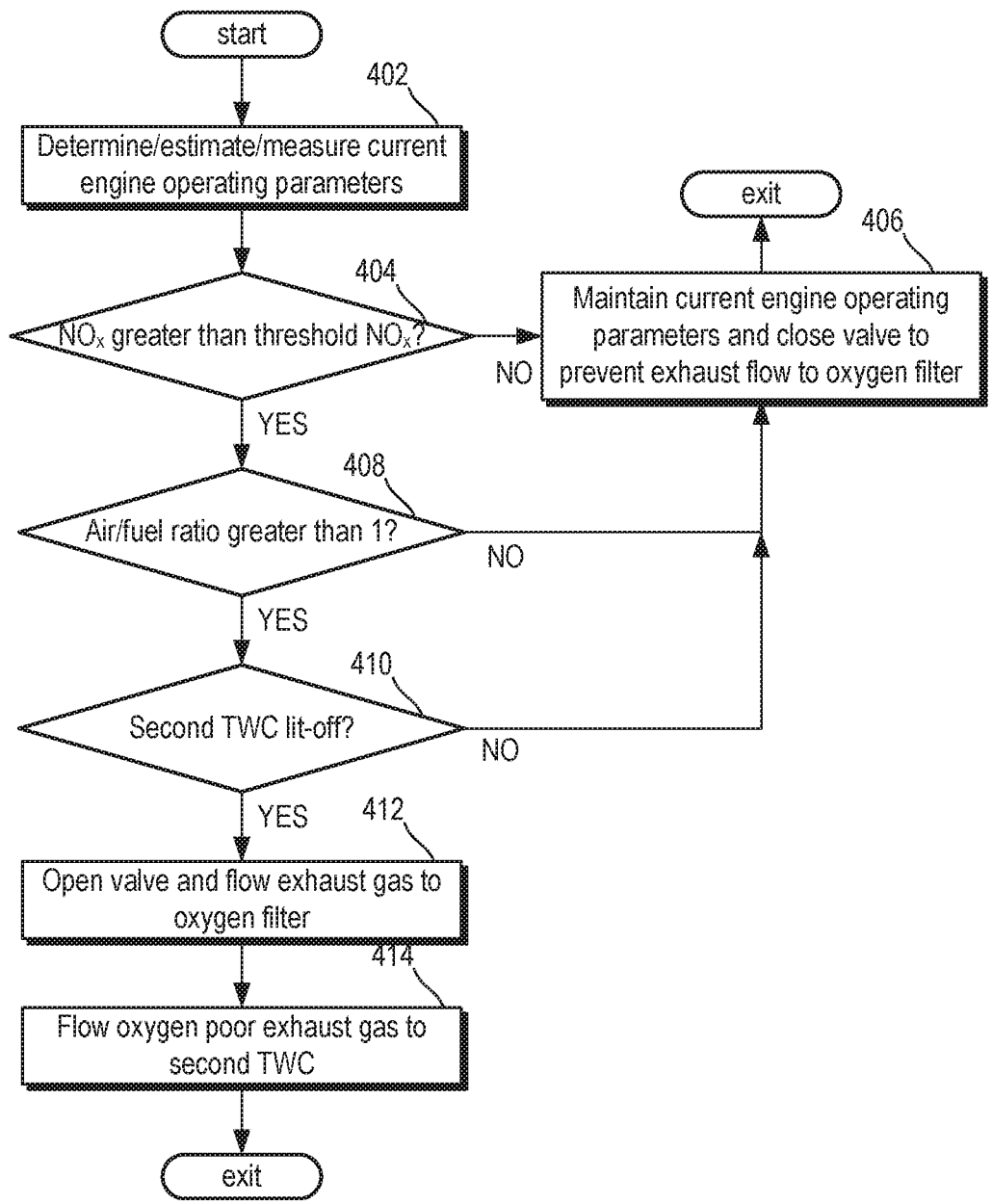
FIG. 4 shows a method for operating the valve in response to engine operating parameters.

The following description relates to systems and methods for a main exhaust passage comprising first catalyst upstream of a bifurcation comprising a second catalyst and an oxygen filter in separate passages. An engine comprising a plurality of cylinders is shown in FIG. 1. The main exhaust passage receives exhaust gas uninterruptedly from the engine and flow the exhaust gas directly to the first catalyst. In one example, there are no intervening components located between the engine and the first catalyst. In this way, the first catalyst receives unfiltered, untreated exhaust gas flow. The exhaust gas then flows to the bifurcation, where the exhaust gas flow is split. A portion of exhaust gas flows into the second passage, wherein oxygen is allowed to flow through the oxygen filter, resulting in oxygen rich exhaust flow through the second passage. Thus, oxygen poor exhaust gas remains upstream of the oxygen filter and is forced to flow up to the first passage and mix with a remaining portion of exhaust gas flow. This results in oxygen poor exhaust gas (relative to exhaust gas at the first catalyst and exhaust gas in the second passage) flowing to the second catalyst. A first embodiment of the main exhaust passage and the first and second passages is shown in FIG. 2. A second embodiment of the main exhaust passage and the first and second passage is shown in FIG. 3, where the second embodiment differs from the first embodiment in that it comprises a valve upstream of the oxygen filter. A method for operating the valve is shown in FIG. 4.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

The figures below depict an exhaust system having first and second catalysts, along with a method for enriching oxygen in an exhaust gas stream in a second exhaust passage having an oxygen filter, flowing oxygen poor exhaust gas to a first exhaust passage comprising a catalyst, and merging the oxygen rich and oxygen poor exhaust gas flows at an intersection downstream of the ceramic membrane and the catalyst. The oxygen poor exhaust gas in the first exhaust passage comprises a concentration of oxygen less than a concentration of oxygen in the oxygen rich exhaust gas flow in the second exhaust passage. The first exhaust passage and the second exhaust passage are spaced away and fluidly sealed from one another except at a bifurcation upstream of the catalyst and the oxygen filter and an intersection downstream of the catalyst and oxygen filter. The catalyst is a second catalyst downstream of a first catalyst located in an exhaust passage upstream of a bifurcation of the exhaust passage. The first catalyst and the second-catalyst are one or more of one-way catalysts, two-way catalysts, three-way catalysts, selective catalytic reduction devices, $NO_x$ traps, and particulate filters, in one example. Exhaust gas flows uninterruptedly from an engine to the first catalyst. The first catalyst receives an exhaust flow comprising a concentration of oxygen higher than a concentration of oxygen in the oxygen poor exhaust gas flow.

FIG. 1 shows a schematic depiction of a vehicle system 6. The vehicle system 6 includes an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as a turbocharger (not shown), and upstream of an after-cooler (not shown). When included, the after-cooler may be configured to reduce the temperature of intake air compressed by the boosting device.

Engine exhaust 25 may include one or more emission control devices 70, which may be mounted in a close-coupled position in the exhaust. One or more emission control devices may include a three-way catalyst, lean NOx filter, SCR catalyst, etc. Herein, the emission control device 70 is a first catalyst which may be configured to oxidize and reduce byproducts created from combustion. An emission control system 72 is located downstream of the first catalyst 70. The emission control system 72 comprises a second catalyst and an oxygen filter, in one example. Specifically, oxidation of exhaust gas byproducts may occur at the first catalyst and reduction of byproducts may occur at the second catalyst, as will be described below. The first catalyst 70 and emission control system 72 are described below with respect to FIG. 2.

As shown, the first catalyst 70 receives exhaust gas uninterruptedly from the engine. As such, there are no components located between the first catalyst 70 and the exhaust manifold 48. Additionally or alternatively, a turbine of a turbocharger and/or a high-pressure exhaust gas recirculation passage may be located between the first catalyst 70 and the exhaust manifold 48.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust flow rate sensor 126 configured to measure a flow rate of exhaust gas through the exhaust passage 35, exhaust gas sensor (located in exhaust manifold 48), temperature sensor 128, and pressure sensor 129 (located downstream of emission control device 70). Other sensors such as additional pressure, temperature, air/fuel ratio, exhaust flow rate and composition sensors may be coupled to various locations in the vehicle system 6. As another example, the actuators may include fuel injectors 66, throttle 62, DPF valves that control filter regeneration (not shown), switch of electric circuit, etc. The control system 14 may include a controller 12. The controller 12 may be configured with computer readable instructions stored on non-transitory memory. The controller 12 receives signals from the various sensors of FIG. 1, processes the signals, and employs the various actuators of FIG. 1 to adjust engine operation based on the received signals and instructions stored on a memory of the controller.

Turning now to FIG. 2, it shows an embodiment 200 of the exhaust passage 35 including the emission control device 70 and the emission control system 72. As such, components previously introduced are similarly numbered in subsequent figures. Exhaust gas flows from a left side to a right side of the figure in a direction substantially parallel to arrow 298. Exhaust gas enters the exhaust passage 35 from an engine (e.g., engine 10 of FIG. 1) and exits the exhaust passage 35 to an ambient atmosphere.

The exhaust passage 35 comprises the emission control device 70 upstream of the emission control system 72. Herein, the emission control device 70 is referred to as a first catalyst 70. The first catalyst 70 comprises a substrate composed of a ceramic monolith with a honeycomb structure in one example. Alternatively, the first catalyst 70 substrate may be composed of cordierite ceramic substrate. The first catalyst 70 substrate may be comprised of other elements without departing from the scope of the present disclosure.

A washcoat of the first catalyst 70 includes catalytic elements including one or more aluminum oxides, titanium oxides, silicon dioxides, and a mixture thereof. The washcoat increases a surface area of the first catalyst 70, which may improve catalytic reactivity. The washcoat further comprises catalytic elements, which may be a mix of transition (e.g., precious) metals including one or more of platinum, palladium, rhodium, osmium, and a mixture thereof. The washcoat may further comprise oxygen storage elements such as ceria and/or ceria/zirconia. In this way, the first catalyst 70 may release oxygen during rich engine operating parameters (e.g., air/fuel ratio less than 1.0) to continue oxidizing CO and hydrocarbons.

The exhaust passage 35 splits at bifurcation 242 downstream of the first catalyst 70, leading to a first passage 244 and a second passage 246. The exhaust passage 35 is fluidly coupled to both the first 244 and second 246 passages, which are substantially identical in length and diameter. The first 244 and second 246 passages are spaced apart and fluidly separated downstream of the bifurcation 242 until intersection 248. The first passage 244 is configured to house second catalyst 210. The second passage 246 is configured to house an oxygen filter 220.

The oxygen filter 220 is located in a portion of the second passage 246 adjacent the bifurcation 242. The oxygen filter 220 is pressed against interior surfaces of the second passage 246. Thus, gas flows through the oxygen filter 220 before flowing through a remainder of the second passage 246. The oxygen filter 220 utilizes a monolithic honeycomb body of ceramic material comprising oxygen sensitive charged elements, in one example. It will be appreciated that the oxygen filter 220 may utilize other elements for separating oxygen from an exhaust gas flow without departing from the scope of the present disclosure. For example, the oxygen filter 200 may comprise perovskites ($ABO_3$) and $Ba_{0.5}Sr_{0.5}Co_{0.8}Fe_{0.2}O_{3-\delta}$ (BSCF) located on a plurality of fibers thinly coated with a ceramic powder. By doing this, a concentration of oxygen in exhaust gas downstream of the oxygen filter 220 in the second passage 246 is higher than a concentration of oxygen in exhaust gas elsewhere in the exhaust passage 35, first passage 244, bifurcation 242, and intersection 248.

The second catalyst 210 is substantially identical to the first catalyst 70 in size, shape, and composition, in one example. Alternatively, the second catalyst is different than the first catalyst 70. For example, the second catalyst 210 comprises a lower concentration of palladium, a higher concentration of rhodium, and no ceria compared to the first catalyst 70. This may be due to hydrocarbons and CO oxidizing efficiently at higher oxygen concentrations and $NO_x$ reducing efficiently at lower oxygen concentrations. As such, more palladium and ceria may be located in the first catalyst 70, compared to the second catalyst 210, to increase available oxygen to promote oxidation of hydrocarbons and CO at the first catalyst 70. On the other hand, the relation of the first passage 244 and the second passage 246 promotes $NO_x$ reduction at the second catalyst 210. As such, more rhodium may be located in the second catalyst 210, compared to the first catalyst 70, to promote reduction of $NO_x$, while ceria is omitted from the second catalyst 210 to further decrease an oxygen concentration at the second catalyst 210. Additionally or alternatively, the second catalyst 210 may not be a three-way catalyst, but may comprise more or less than three catalysts. In one example, the second catalyst 210 comprises only rhodium.

In some embodiments, additionally or alternatively, the first 70 and second 210 catalyst may be wholly different catalysts. As an example, the first catalyst 70 is a three-way catalyst and the second catalyst 210 comprises a single precious metal (e.g., catalyst), which may or may not be common to the first catalyst 70. Alternatively, the first catalyst 70 and the second catalyst 210 may be one or more of a $NO_x$ trap, selective catalytic reduction device, particulate filter, or a combination thereof without departing from the scope of the disclosure. The first catalyst 70 and the second catalyst 210 may be complementary to one another such that the first catalyst 70 is configured to facilitate oxidative reactions and the second catalyst 210 is configured to facilitate reductive reactions, or vice-versa.

Additionally or alternatively, the second catalyst 210 may be larger than the first catalyst 70. In one example, the first catalyst 70 may treat a smaller amount of exhaust byproducts than the second catalyst 210. Specifically, the first catalyst 70 treats carbon-containing elements and other constituents susceptible to oxidation, whereas the second catalyst 210 treats nitrogen containing elements and/or other constituents susceptible to reduction. Due to the ubiquity of nitrogen in intake air, combustion may produce a greater amount of $NO_x$ than CO and unburned hydrocarbons combined. In this way, production costs of first 70 and second 210 catalysts may be reduced by optimizing the size and composition of the catalysts in accordance with byproducts being treated therein.

An exhaust gas flow is depicted in the main exhaust passage 35, first passage 244, and second passage 246. Exhaust gas oxygen concentrations are similar for similar shaped arrows. For example, solid line arrows comprise a substantially identical concentration of oxygen to one another. Additionally, similarly sized dash arrows comprise a substantially identical concentration of oxygen to one another. The dashes are shown in different sizes, with large dashes being bigger than medium dashes, which are bigger than small dashes. Engine exhaust gas comprises an initial concentration ($C_0$) of oxygen. Solid lines arrows comprise a first concentration ($C_1$ of oxygen. Large dash arrows comprise a second concentration ($C_2$) of oxygen. Medium dash arrows comprise a third concentration ($C_3$) of oxygen. Small dash arrows comprise a fourth concentration ($C_4$) of oxygen. In one example, a relationship of the concentrations is $C_2 > C_0 > C_1 > C_3 > C_4$. The exhaust flow is described below. In one example, oxygen rich flow refers to a concentration of oxygen equal to $C_2$ and oxygen poor refers to a concentration of oxygen equal to $C_3$.

Exhaust gas from the engine comprises unburned hydrocarbons, CO, $O_2$, and $NO_x$. In one example, engine exhaust gas flows uninterruptedly from the engine to the first catalyst 70. As such, the engine exhaust gas is unfiltered and untreated. As the exhaust gas flows through the first catalyst 70, a majority, if not all, of the hydrocarbons and CO are oxidized into $CO_2$, thereby reducing some $O_2$ into $H_2O$. Additionally, a small amount of $NO_x$ is reduced into $N_2$, however, high $O_2$ concentrations inhibit the reduction of NO$_x$ at a catalyst. As such, the first catalyst 70 may not sufficiently reduce NO$_x$ emissions during lean engine operating conditions.

As such, exhaust gas flows to the bifurcation 242 (arrow 274) comprising NO$_x$, CO$_2$, H$_2$O, and O$_2$ with a concentration of oxygen less than C$_0$ due to oxidation of cyclical hydrocarbons and hydrocarbons chains consuming at least some O$_2$. The exhaust gas flow splits with a portion flowing to the first passage 244 and a remaining portion flowing to the second passage 246. Exhaust gas flow to the second passage 246 (arrow 276) is filtered by the oxygen filter 220, resulting in an exhaust stream (arrow 278) comprising substantially all oxygen in the second passage 246 having a concentration of oxygen equal to C$_2$. In one example, arrow 278 is pure O$_2$ and C$_2$ is substantially equal to 100% O$_2$. In this way, the exhaust gas flow prevented from flowing through the second passage 246 flows into the first passage 244 (arrow 280) with a concentration of oxygen equal to C$_4$. By doing this, exhaust gas flow 280 mixes with exhaust gas flow 284, resulting in an exhaust gas mixture (arrow 286) having a concentration of oxygen equal to C$_3$.

Thus, the second catalyst 210 receives an exhaust gas flow (arrow 286) comprising an overall reduced concentration of oxygen (C$_3$), which may promote the reaction of the catalyst with NO$_x$ facilitated by the second catalyst 210. As such, the relationship between the first 244 and second 246 passages may promote the extension of a lean operating condition, thereby increasing fuel economy. In this way, the second passage 246 comprises an oxygen rich exhaust flow and the first passage 244 comprises an oxygen poor exhaust flow. Exhaust gas downstream of the second catalyst 210 (arrow 290) in the first passage 244 comprises mostly H$_2$O, CO$_2$, and N$_2$ before mixing with exhaust flow from the second passage 246 (arrow 288) in the intersection 248. The mixture of exhaust flow from the first 244 and second 246 passages (arrow 292) flows to an ambient atmosphere, in one example. Alternatively, exhaust flow 292 may flow to an after-treatment device different than a TWC (e.g., a particulate filter), in some examples. Additionally or alternatively, exhaust flow from the first 244 and second 246 passages may not mix prior to flowing into the intersection 248. The concentrated oxygen flow in the second passage 246 may be diverted prior to flowing through the intersection 248 and/or to an ambient atmosphere. In one example, the concentrated oxygen flow may be routed to a particulate filter during a regeneration. In this way, the oxygen may assist the particulate filter temperature to sufficiently increase to burn particulate matter stored thereon.

As described above, the first passage 244 may receive O$_2$, but a concentration of O$_2$ in the first passage 244 is decreased compared to an exhaust flow between the first catalyst 70 and the bifurcation 242. In one example, the concentration decreases by a magnitude of two. It will be appreciated that the concentration may change by more or less than a magnitude of two without departing from the scope of the present disclosure. The mixture of gases from the first 244 and second 246 passages in the intersection 248 are directed toward an ambient atmosphere.

In some embodiments, additionally or alternatively, the second catalyst 210 is a selective catalytic reduction (SCR) device, and a urea injector may be located in the first passage 244 upstream of the second catalyst 210. Thus, urea is not injected into an exhaust stream upstream of the first catalyst 70. This prevents the first catalyst 70 from receiving reductant while promoting greater coverage of the second catalyst 210 compared to placing the urea injector upstream of the first catalyst 70. Alternatively, the urea injector is located upstream of the first catalyst 70 so that urea may be delivered to both the first catalyst 70 and the second catalyst 210. This may allow both catalysts to receive reductant. Additionally or alternatively, a first urea injector is located directly upstream of the first catalyst 70 and a second urea injector is located in the first passage 244 directly upstream of the second catalyst 210. As such, the injectors may be operated separately based on urea demands of the catalysts, thereby preserving a urea load of a urea reservoir.

Thus, a system comprises: an exhaust passage comprising a first catalyst upstream of a bifurcation and a first passage and a second passage extending from the bifurcation, where the first passage comprises a second catalyst and the second passage comprises an oxygen filter, and where the first and second passages are fluidly separated and spaced apart from one another between the bifurcation and an intersection located downstream of the second catalyst and the oxygen filter. The first passage comprises oxygen poor exhaust gas and the second passage comprises oxygen rich exhaust gas, and where the oxygen poor and oxygen rich exhaust gases merge at the intersection. The first catalyst is downstream of an engine with no intervening components located therebetween. In one example, the first catalyst and the second catalyst are identical. However, the first and second catalysts may be different without departing from the scope of the present disclosure. The first and/or second catalysts are one or more one-way catalysts, two-way catalysts, three-way catalysts, selective catalytic reduction devices, NO$_x$ traps, particulate filters, and combinations thereof in one example. Additionally or alternatively, the first and/or second catalysts comprise greater than three catalysts. The first catalyst comprises a greater amount of catalysts configured for oxidation and storing oxygen than the second catalyst, and where the second catalyst comprises a greater amount of catalyst configured for reducing NO$_x$ than the first catalyst. The second catalyst may be larger than the first catalyst. The first catalyst receives exhaust gas with a higher concentration of oxygen than the second catalyst. The oxygen filter may be pressed against surfaces of the second passage, and where exhaust gas flowing through the second passage flows through the oxygen filter before reaching the intersection. Gases from the first and second passages are expelled to an ambient atmosphere from the intersection. Additionally or alternatively, an optional exhaust-aftertreatment device and/or exhaust gas sensor may be located downstream of the intersection.

Turning now to FIG. 3, it shows an exemplary embodiment 300, which is substantially similar to the embodiment 200 of FIG. 2. Both embodiments comprise the first catalyst 70, the second catalyst 210 located in the first passage 244, and the oxygen filter 220 located in the second passage 246. However, the embodiment 300 differs from the embodiment 200 in that it comprises a valve 306 located upstream of the oxygen filter 220.

The valve 306 is located between the bifurcation 242 and the oxygen filter 220. The valve 306 may comprise a fully open position and a fully closed position. The fully open position permits exhaust gas to flow to the oxygen filter 220 to enable separation of oxygen from the exhaust gas, thereby decreasing an amount of oxygen flowing to the second catalyst 210. The fully closed position prevents exhaust gas from flowing to the oxygen filter 220, thereby allowing unfiltered exhaust gas to flow to the second catalyst 210. The valve 306 may be fully open when the second catalyst 210 is lit-off and engine operation is lean (e.g., air/fuel ratio greater than 1.0). Alternatively, the valve 306 may be fully closed when the second catalyst 210 is not active (e.g., not lit-off) and/or when the engine operation is rich (e.g., air/fuel ratio less than 1.0). In this way, exhaust gas flow to the oxygen filter 220 may be adjusted via the valve 306.

In one example, the valve 306 is an electronic valve coupled to controller 12. An actuator adjusts a position of the valve 306 based on instructions from the controller 12. In some examples, the valve 306 may comprise positions between the fully open and fully closed positions. Thus, the controller 12 may signal to the actuator to move the valve 306 to a more open or a more closed position, wherein the more open position permits more exhaust gas flow to the oxygen filter 220 than the more closed position. As such, the more open position is closer to the fully open position than the more closed position. A method for adjusting the valve 306 based on different operating conditions is described below with respect to FIG. 4.

In one example, the method includes oxidizing exhaust gas byproducts in a first three-way catalyst located in a main exhaust passage with a first concentration of oxygen, and flowing the oxidized exhaust gas through a bifurcation of the main exhaust passage to a first passage and a second passage, and where the first passage comprises a second three-way catalyst and the second passage comprises an oxygen filter, where the second passage comprises exhaust gas with a second concentration of oxygen and the first passage comprises exhaust gas with a third concentration of oxygen, and where the second concentration is greater than the first concentration, which is greater than the third concentration. The second three-way catalyst is configured to reduce the oxidized exhaust gas flow. The first passage and the second passage are identical in diameter and length. The oxygen filter is a ceramic filter with no electric or mechanical components located therein.

Turning now to FIG. 4, a method 400 for operating valve 306 in the second passage 246 upstream of the oxygen filter 220 is shown. Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 400 begins at 402, where the method 400 determines, estimates, and/or measures current engine operating parameters. Current engine operating parameters may include, but are not limited to, one or more of engine temperature, ambient temperature, vehicle speed, mass intake air flow, $NO_x$ concentration, exhaust mass flow rate, first catalyst temperature, second catalyst temperature, throttle position, and air/fuel ratio.

At 404, the method includes determining if $NO_x$ is greater than a threshold $NO_x$ amount. The threshold $NO_x$ amount may be based on an amount of $NO_x$ able to be sufficiently reduced in the presence of oxygen in the first catalyst. A concentration and/or amount of $NO_x$ may be measured by an exhaust gas sensor between the engine and the first catalyst (e.g., sensor 126 of FIG. 1). If $NO_x$ is not greater than the threshold $NO_x$, then the method proceeds to maintain current engine operating parameters and fully closes the valve to prevent exhaust flow to the oxygen filter. In this way, oxygen rich exhaust gas flows to the second catalyst, wherein the exhaust gas is oxygen rich relative to an exhaust flow to the second catalyst when the valve is in a more open position.

If the $NO_x$ is greater than the threshold $NO_x$, then the method 400 proceeds to determine if an air/fuel ratio is greater than one (e.g., if engine operation is lean). The air/fuel ratio may be determined via feedback from one or more of a throttle position, an exhaust gas sensor, and other suitable devices. If the air/fuel ratio is equal to or less than one, then engine operation may be at stoichiometric or rich (e.g., fueling is increased) and the method 400 proceeds to 406, as described above. In one example, the valve is moved to a more closed position, despite the $NO_x$ being greater than the threshold $NO_x$, due to an amount of oxygen in the exhaust gas already being sufficiently low without the oxygen filter. That is to say, $NO_x$ may efficiently react-in the second catalyst during stoichiometric and rich fueling conditions without utilization of the oxygen filter, thereby prolonging a lifespan of the oxygen filter.

If the air/fuel ratio is greater than one, then engine operation is lean (e.g., intake air concentration is increased compared to rich) and the method 400 proceeds to 410 to determine if the second catalyst is lit-off. A light-off temperature of the second catalyst may be based on a temperature of the second catalyst capable of activating one or more catalysts to efficiently facilitate $NO_x$ reduction. The method 400 may estimate a temperature of the second catalyst by monitoring a temperature of exhaust gas flowing to the first passage via the exhaust sensor located between the engine and the first catalyst. Alternatively, the second catalyst may comprise a temperature sensor integrated therein which may directly provide feedback regarding a current temperature of the second catalyst. If the second catalyst is not lit-off (e.g., temperature less than the light-off temperature), then the method 400 proceeds to 406, as described above. In this way, oxygen-rich exhaust gas continues to flow to the second catalyst, which may accelerate the second catalyst reaching the light-off temperature.

In some embodiments, additionally or alternatively, oxygen flow through the second catalyst may be adjusted based on temperatures of the first and/or second catalysts. The adjusting may be based on feedback from one or more temperature sensors located in or downstream of one or more of the first catalyst, second catalyst, and oxygen filter. It will be appreciated by someone skilled in the art that a sensor may not be located at each of the above areas mentioned and that a temperature may be estimated. As one example, a single temperature sensor located upstream of the first catalyst may be used to calculate an approximate temperature inside of the first catalyst, inside of the second catalyst, or inside of the oxygen filter. Thus, temperatures of various regions adjacent or inside of the first catalyst, second catalyst, and/or oxygen filter may be estimated via feedback from a temperature sensor located in the exhaust passage. In one example, oxygen flow to the second catalyst may increase by moving the valve to a more closed position in response to a temperature of the second catalyst being less than a threshold temperature (e.g., the light-off temperature). Additionally, oxygen flow to the second catalyst may increase in response to a temperature of the oxygen filter being greater than a threshold filter temperature, where the threshold filter temperature is based on a temperature of the filter being too hot, thereby increasing a likelihood of oxygen filter degradation. In some examples, a temperature sensor may be omitted and temperature values of the first catalyst, second catalyst, and oxygen filter may be estimated based on engine operating parameters including one or more of engine load, vehicle speed, engine speed, manifold pressure, exhaust backpressure, ambient temperature, humidity, air/fuel ratio, and fuel grade (e.g., diesel, biodiesel, E85, 93 octane, and 87 octane).

Additionally or alternatively, an exhaust gas sensor may be located downstream of the oxygen filter. If feedback from the exhaust gas sensor indicated that the oxygen filter is degraded, then the valve may be moved to a fully closed position and an entirety of exhaust gas flowing through the first catalyst is directed to the second catalyst without flowing through the oxygen filter. The oxygen filter may be indicated as degraded if the exhaust gas sensor measures an oxygen concentration less than a threshold concentration (e.g., less than 98% oxygen). Additionally, an indicator lamp may be activated to notify a vehicle operator of the degradation.

If the second catalyst is lit-off, the air/fuel ratio is greater than one, and the $NO_x$ is greater than the threshold $NO_x$, then the method 412 proceeds to move the valve to a more open position to flow exhaust gas to the oxygen filter. In this way, an oxygen rich exhaust flow flows through the second passage, separate from the first passage. Additionally, oxygen poor exhaust flow remains upstream of the oxygen filter and flows back to the bifurcation upstream of the first and second passages.

At 414, the oxygen poor exhaust gas flows to the second catalyst to facilitate the reaction between $NO_x$ and the catalyst. The exhaust gas then flows to an intersection between the first and second passages, where the oxygen poor and oxygen rich exhaust streams merge before flowing to an ambient atmosphere.

In this way, a lean operation of an engine may be extended by bifurcating an exhaust passage, downstream of a first catalyst, into first and second passages comprising a second catalyst and an oxygen filter, respectively. The first and second passages are maintained separate (e.g., sealed) until an intersection located downstream of the second catalyst and the oxygen filter. The technical effect of placing a second catalyst in the first passage and the oxygen filter in the second passage is to flow oxygen-poor exhaust gas to the second catalyst to increase the efficiency of the reduction of $NO_x$. By doing this, less oxygen is present at the catalyst, thereby improving the reduction of $NO_x$. Additionally, fuel efficiency is increased by prolonging the lean engine operating parameters.

A method comprising enriching oxygen in an exhaust gas stream in a second exhaust passage having an oxygen filter, flowing oxygen poor exhaust gas to a first exhaust passage comprising a catalyst, and merging the oxygen rich and oxygen poor exhaust gas flows at an intersection downstream of the oxygen filter and the catalyst. A first example of the method further includes where the oxygen poor exhaust gas in the first exhaust passage comprises a concentration of oxygen less than a concentration of oxygen in the oxygen rich exhaust gas flow in the second exhaust passage. A second example of the method, optionally including the first example, further includes where the first exhaust passage and the second exhaust passage are spaced away and fluidly sealed from one another except at a bifurcation upstream of the catalyst and the oxygen filter and at an intersection downstream of the catalyst and oxygen filter. A third example of the method, optionally including the first and/or second examples, further includes where the catalyst is a second catalyst downstream of a first catalyst located in an exhaust passage upstream of a bifurcation of the exhaust passage. A fourth example of the method, optionally including one or more of the first through third examples, further includes where the first catalyst and the second-catalyst are one or more of one-way catalysts, two-way catalysts, three-way catalysts, selective reduction devices, $NO_x$ traps, and particulate filters. A fifth example of the method, optionally including one or more of the first through fourth examples, further includes where exhaust gas flows uninterruptedly from an engine to the first catalyst. A sixth example of the method, optionally including one or more of the first through fifth examples, further includes where the first catalyst receives an exhaust flow comprising a concentration of oxygen higher than a concentration of oxygen in the oxygen poor exhaust gas flow.

A system comprising an exhaust passage comprising a first catalyst upstream of a bifurcation and a first passage and a second passage extending from the bifurcation, where the first passage comprises a second catalyst and the second passage comprises an oxygen filter, and where the first and second passages are fluidly separated and spaced apart from one another between the bifurcation and an intersection located downstream of the second catalyst and the oxygen filter. A first example of the system further includes where the first passage comprises oxygen poor exhaust gas and the second passage comprises oxygen rich exhaust gas, and where the oxygen poor and oxygen rich exhaust gases merge at the intersection. A second example of the system optionally including the first example further includes where the first catalyst is downstream of an engine with no intervening components located therebetween. A third example of the system, optionally including the first and/or second examples, further includes where the first catalyst and the second catalyst are identical. A fourth example of the system, optionally including one or more of the first through third examples, further includes where the first catalyst comprises a greater amount of catalysts configured for oxidation and storing oxygen than the second catalyst, and where the second catalyst comprises a greater amount of catalyst configured for reduction than the first three-way catalyst. A fifth example of the system, optionally including one or more of the first through fourth examples, further includes where the second catalyst is larger than the first catalyst. A sixth example of the system, optionally including one or more of the first through fifth examples, further includes where the first catalyst receives exhaust gas with a higher concentration of oxygen than the second catalyst. A seventh example of the system, optionally including one or more of the first through sixth examples, further includes where the oxygen filter is pressed against surfaces of the second passage, and where exhaust gas flowing through the second passage flows through the oxygen filter before reaching the intersection. An eighth example of the system, optionally including one or more of the first through seventh examples, further includes where gases from the first and second passages are expelled to an ambient atmosphere from the intersection.

A method, comprising oxidizing exhaust gas byproducts in a first three-way catalyst located in a main exhaust passage with a first concentration of oxygen and flowing the oxidized exhaust gas through a bifurcation of the main exhaust passage to a first passage and a second passage, and where the first passage comprises a second three-way catalyst and the second passage comprises an oxygen filter, where the second passage comprises exhaust gas with a second concentration of oxygen and the first passage comprises exhaust gas with a third concentration of oxygen, and where the second concentration is greater than the first concentration, which is greater than the third concentration. A first example of the method further includes where the second three-way catalyst is configured to reduce the oxidized exhaust gas flow. A second example of the method optionally including the first example further includes where the first passage and the second passage are identical in diameter and length. A third example of the method optionally including the first and/or second examples further includes where the oxygen filter is a ceramic filter with no electric or mechanical components located therein.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
responsive to engine exhaust air-fuel-ratio greater than one, adjusting an exhaust valve to enrich oxygen in an exhaust gas stream in a second exhaust passage having an oxygen filter, flow oxygen poor exhaust gas to a first exhaust passage comprising a catalyst, and merge the oxygen rich and oxygen poor exhaust gas flows at an intersection downstream of the oxygen filter and the catalyst.

2. The method of claim 1, wherein valve adjusting is further responsive to whether the catalyst has reached a light-off condition, and wherein the oxygen poor exhaust gas in the first exhaust passage comprises a concentration of oxygen less than a concentration of oxygen in the oxygen rich exhaust gas flow in the second exhaust passage.

3. The method of claim 1, wherein the first exhaust passage and the second exhaust passage are spaced away and fluidly sealed from one another except at a bifurcation upstream of the catalyst and the oxygen filter and at an intersection downstream of the catalyst and oxygen filter.

4. The method of claim 1, wherein the catalyst is a second catalyst downstream of a first catalyst located in an exhaust passage upstream of a bifurcation of the exhaust passage, and wherein responsive to engine exhaust gas air-fuel-ratio less than one, adjusting the valve to block exhaust flow to the exhaust filter.

5. The method of claim 4, wherein the first catalyst and the second-catalyst are one or more of one-way catalysts, two-way catalysts, three-way catalysts, selective reduction devices, $NO_x$ traps, and particulate filters.

6. The method of claim 4, wherein exhaust gas flows uninterruptedly from an engine to the first catalyst.

7. The method of claim 4, wherein the first catalyst receives an exhaust flow comprising a concentration of oxygen higher than a concentration of oxygen in the oxygen poor exhaust gas flow.

8. A system comprising:
an exhaust passage comprising a first catalyst upstream of a bifurcation;
a first passage and a second passage extending from the bifurcation, where the first passage comprises a second catalyst and the second passage comprises an oxygen filter, and where the first and second passages are fluidly separated and spaced apart from one another between the bifurcation and an intersection located downstream of the second catalyst and the oxygen filter;
a valve coupled upstream of the oxygen filter; and
a processor with instructions stored in non-transitory memory to open the valve to flow exhaust to the oxygen filter responsive to each of NOx greater than a threshold, air-fuel-ratio greater than stoichiometry, and the second catalyst having reached light-off; and closing the valve otherwise.

9. The system of claim 8, wherein the first passage comprises oxygen poor exhaust gas and the second passage comprises oxygen rich exhaust gas, and where the oxygen poor and oxygen rich exhaust gases merge at the intersection.

10. The system of claim 8, wherein the first catalyst is downstream of an engine with no intervening components located therebetween.

11. The system of claim 8, wherein the first catalyst and the second catalyst are identical.

12. The system of claim 8, wherein the first catalyst comprises a greater amount of catalysts configured for oxidation and storing oxygen than the second catalyst, and where the second catalyst comprises a greater amount of catalysts configured for reduction than the first catalyst.

13. The system of claim 8, wherein the second catalyst is larger than the first catalyst.

14. The system of claim 8, wherein the first catalyst receives exhaust gas with a higher concentration of oxygen than the second catalyst.

15. The system of claim 8, wherein the oxygen filter is pressed against surfaces of the second passage, and where exhaust gas flowing through the second passage flows through the oxygen filter before reaching the intersection.

16. The system of claim 8, wherein gases from the first and second passages are expelled to an ambient atmosphere from the intersection.

\* \* \* \* \*